United States Patent
Grosch et al.

(10) Patent No.: US 7,493,843 B2
(45) Date of Patent: Feb. 24, 2009

(54) DEVICE FOR DELIVERING A PAYLOAD, ESPECIALLY FOR NEUTRALIZING MINES OR THE LIKE

(75) Inventors: Hermann Grosch, Nienhagen (DE); Lutz Broll, Uelzen (DE)

(73) Assignee: Rheinmetall Landsysteme GmbH, Kiel (DE)

(*) Notice: Subject to any disclaimer, the term of this patent is extended or adjusted under 35 U.S.C. 154(b) by 0 days.

(21) Appl. No.: 11/235,267

(22) Filed: Sep. 26, 2005

(65) Prior Publication Data
US 2008/0148926 A1  Jun. 26, 2008

(30) Foreign Application Priority Data
Sep. 24, 2004 (DE) ............... 10 2004 046 571

(51) Int. Cl.
*B64D 1/04* (2006.01)
(52) U.S. Cl. ................................................ 89/1.13
(58) Field of Classification Search .......... 89/1.13; 102/302, 315, 402, 425
See application file for complete search history.

(56) References Cited

U.S. PATENT DOCUMENTS

| | | | |
|---|---|---|---|
| 1,303,764 A | | 4/1919 | Broadway |
| 1,388,545 A | | 8/1921 | Bohan |
| 2,480,927 A | * | 9/1949 | Hopkins .................... 244/3.23 |
| 2,973,172 A | * | 2/1961 | Bixby ...................... 244/138 R |
| 3,088,403 A | * | 5/1963 | Bartling et al. ............. 102/399 |
| 3,745,956 A | * | 7/1973 | Bertheas ....................... 114/23 |
| 3,921,739 A | | 11/1975 | Rich et al. |
| 4,493,240 A | * | 1/1985 | Norton ........................ 89/1.14 |
| 4,505,441 A | | 3/1985 | Kirsch et al. |
| 4,505,442 A | | 3/1985 | Kirsch et al. |
| 4,619,424 A | * | 10/1986 | Twardawa et al. ....... 244/151 B |
| 4,860,968 A | * | 8/1989 | Pinson ....................... 244/3.12 |
| 5,012,717 A | * | 5/1991 | Metersky et al. ............. 89/1.11 |
| 5,099,746 A | * | 3/1992 | Gustavsson et al. .......... 89/1.11 |
| 5,760,330 A | * | 6/1998 | Himmert et al. ............ 102/489 |
| 5,856,629 A | | 1/1999 | Grosch et al. ................ 89/1.13 |
| 5,932,833 A | * | 8/1999 | Hammon et al. ............ 102/213 |

(Continued)

FOREIGN PATENT DOCUMENTS

DE     33 35 337     4/1987

(Continued)

OTHER PUBLICATIONS

F-117 Lands. <http://ipmslondon.tripod.com/sitebuildercontent/sitebuilderpictures/f117lands.jpg> Apr. 29, 2004. 2 pages.*

(Continued)

*Primary Examiner*—Troy Chambers
*Assistant Examiner*—Jonathan C Weber
(74) *Attorney, Agent, or Firm*—Klaus P. Stoffel

(57) ABSTRACT

A payload is housed in a deliverable body of a device, such as in a projectile, and this device is delivered as close as possible to a target. At the landing point, a drive system of the body is activated to take the payload directly to the target. The target is described by target coordinates, for example, which are programmed into the device before it is launched. The device itself can be steered or unsteered. The drive system installed on the body or formed by the body is variable and should occupy a minimum of space.

7 Claims, 7 Drawing Sheets

U.S. PATENT DOCUMENTS

| | | | |
|---|---|---|---|
| 6,237,875 B1 | 5/2001 | Menne et al. | |
| 6,293,202 B1 * | 9/2001 | Woodall et al. | 102/387 |
| 6,626,078 B2 * | 9/2003 | Thornton | 89/1.13 |
| 6,662,701 B2 | 12/2003 | Grosch et al. | 89/1.13 |
| 6,738,314 B1 * | 5/2004 | Teeter et al. | 367/131 |
| 6,809,520 B1 * | 10/2004 | Nelson | 324/329 |
| 7,007,626 B2 * | 3/2006 | Hobson et al. | 114/312 |
| 2002/0036104 A1 * | 3/2002 | Kerrebrock et al. | 180/6.2 |
| 2003/0126979 A1 * | 7/2003 | Grosch et al. | 89/1.13 |

FOREIGN PATENT DOCUMENTS

| | | |
|---|---|---|
| DE | 44 31 842 | 3/1996 |
| DE | 19619135 | 11/1997 |
| DE | 202 05 547 | 9/2002 |
| DE | 10147837 | 4/2003 |
| DE | 10215200 | 10/2003 |

OTHER PUBLICATIONS

*GI Robot, Janes International Defense Review*, Jan. 2001, Mark Hewish, (pp. 34-40).

* cited by examiner

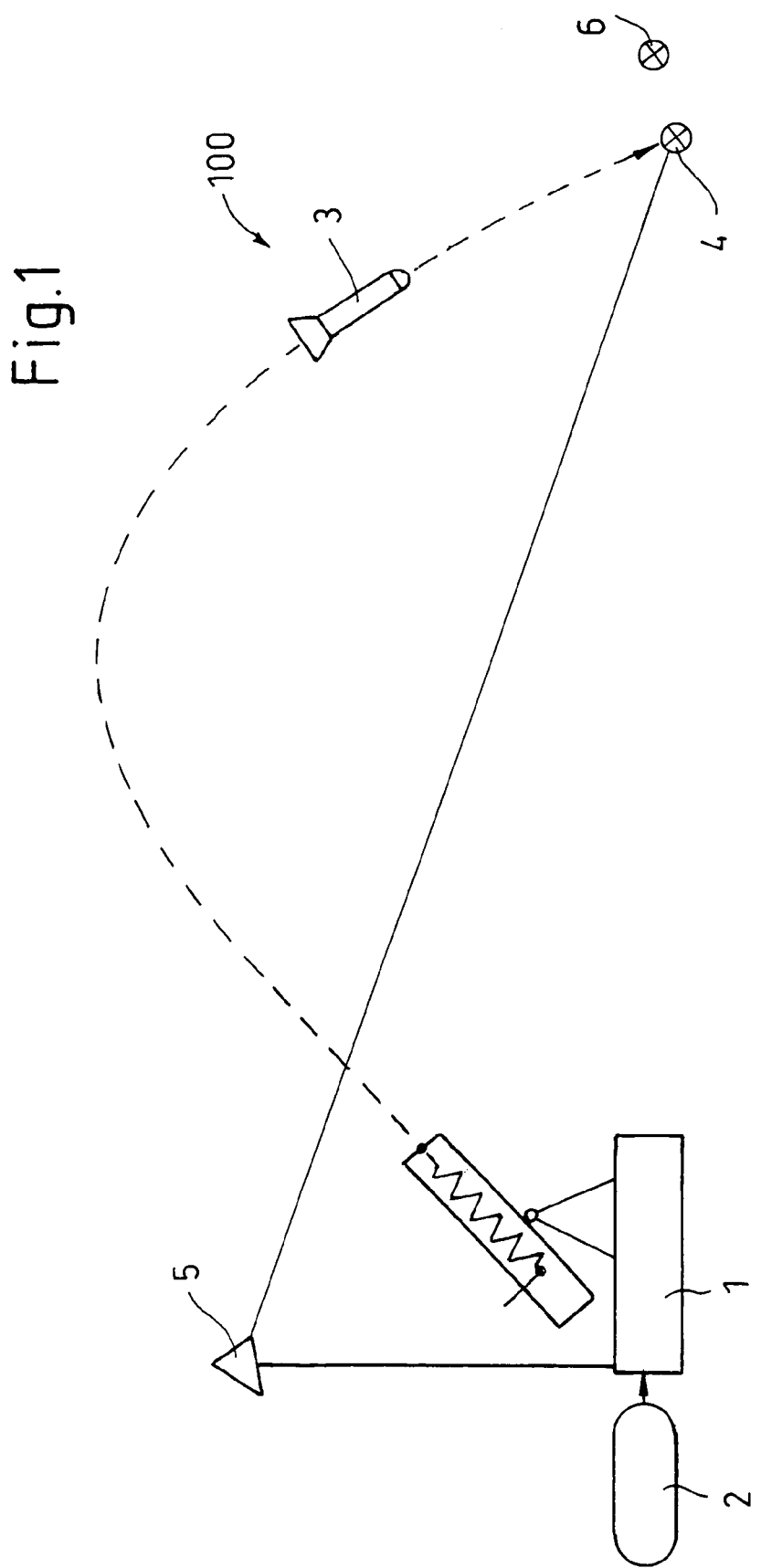

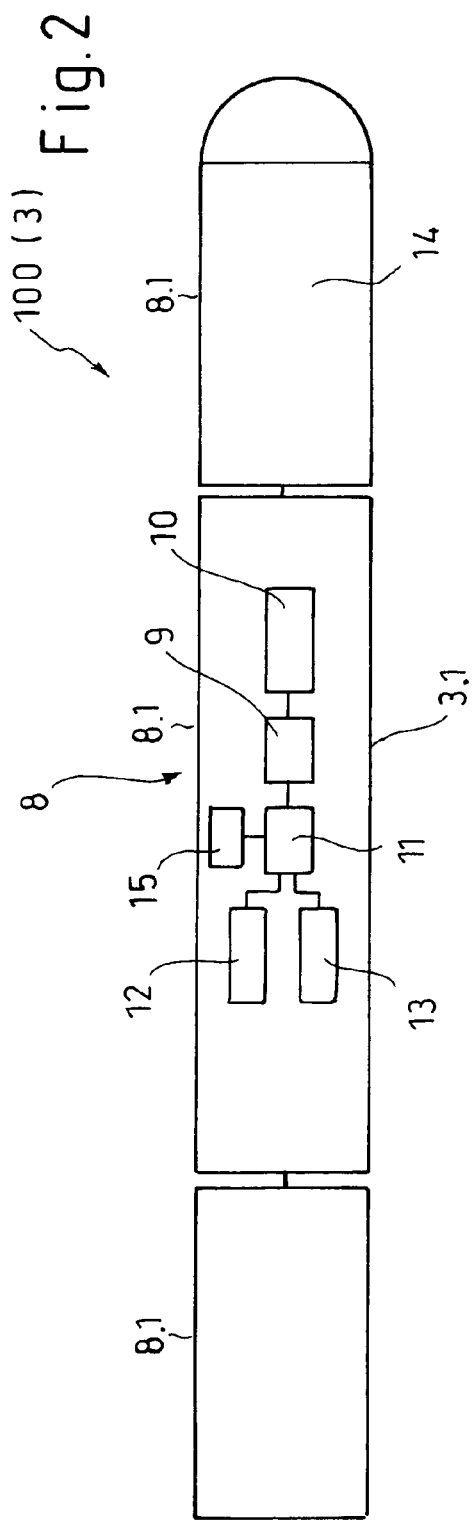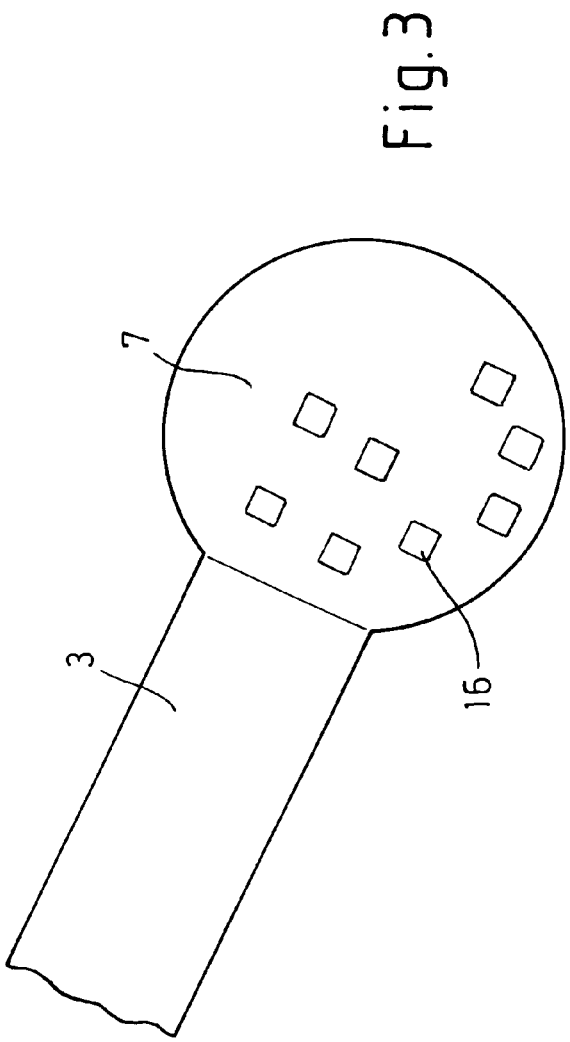

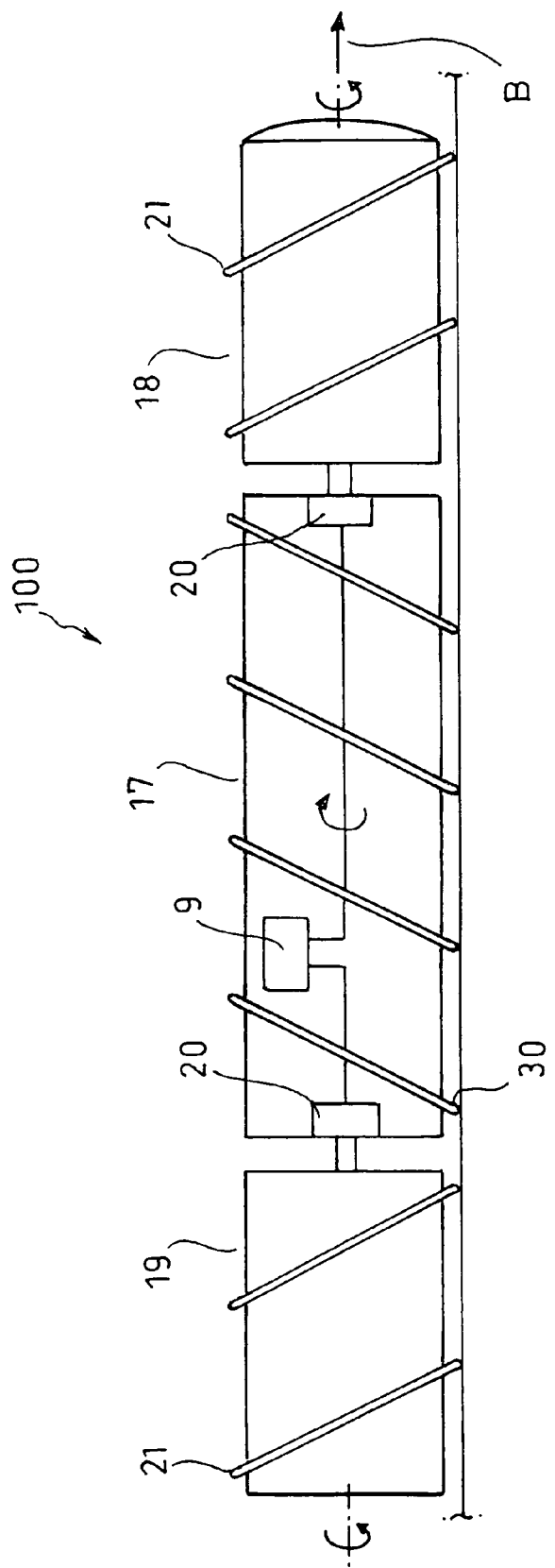

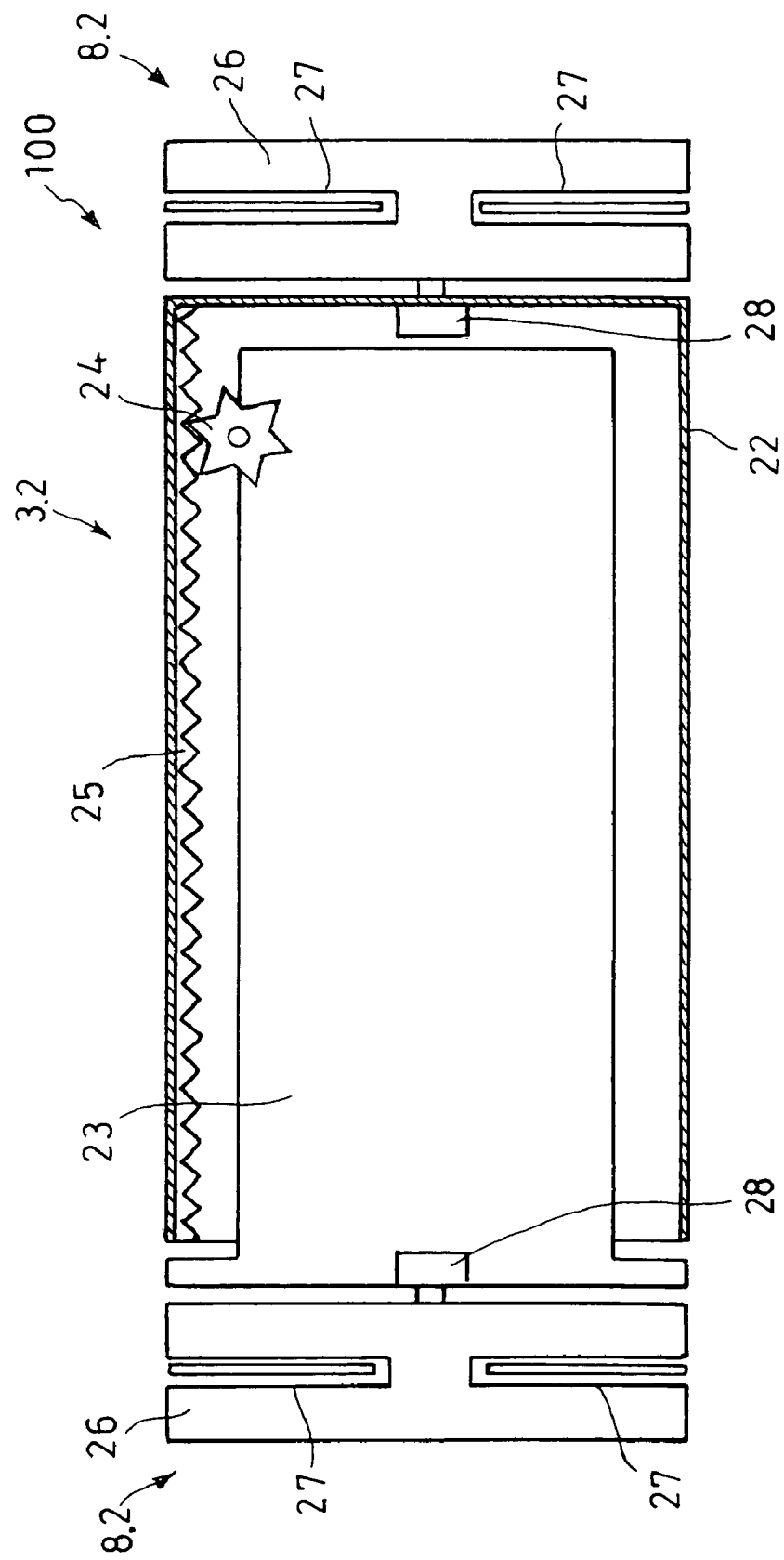

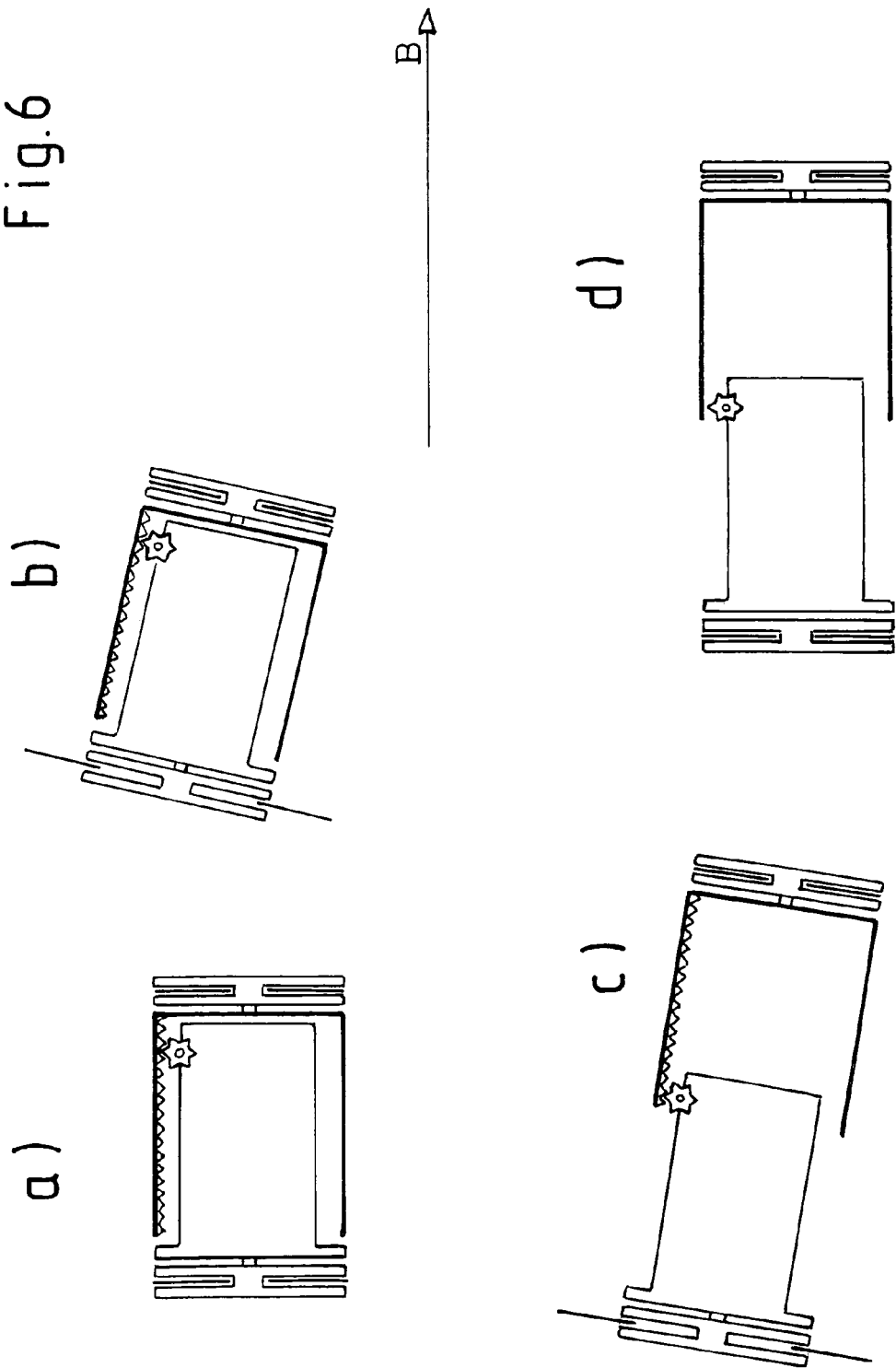

Fig.6
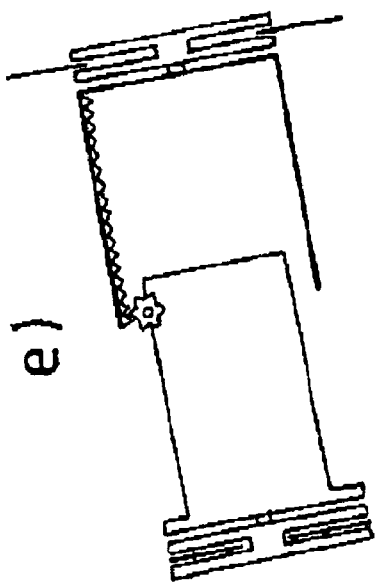
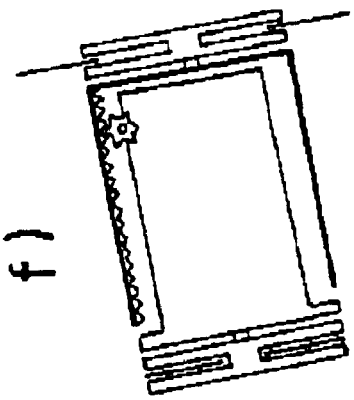
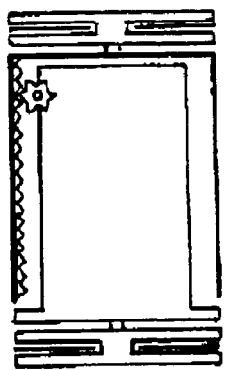

DEVICE FOR DELIVERING A PAYLOAD, ESPECIALLY FOR NEUTRALIZING MINES OR THE LIKE

BACKGROUND OF THE INVENTION

The invention relates to a device designed as a projectile or missile and intended to deliver a payload to a target, where the payload serves preferably to trigger open or buried mines, explosive charges, or the like.

It is known that a payload can be delivered by several means, including remote-guided or remote-controlled vehicles, which are guided by an operator to the required position. There, the payload, such as an explosive charge or a high-power microwave generator, etc., is set down in the desired position and activated.

A remote-guided vehicle for clearing mines is known from DE 196 19 135 C2. Another remote-guided mine-clearing system is described in DE 102 15 200 A1. The vehicles must be designed so that they can reach the target in the type of terrain where they are to be deployed.

DE 101 47 837 A1 takes a different approach. Here a launch system and a warhead for neutralizing mines is disclosed, the warhead being provided with a system for directing it to the target. The payload is in a fragmentation type warhead, which is delivered to the target by the launch system. The warhead itself is equipped with several components, including a trajectory-correcting device, so that the payload will be activated precisely over the mine and thus achieve a high fragmentation density.

SUMMARY OF THE INVENTION

Building on this basic idea of delivering a payload to a target by means of a launchable device such as a projectile or the like, the object of the present invention is to make it possible for a device with a payload delivered to the landing site to be activated by remote control and/or driven under remote control to the target.

The invention is based on the idea of integrating the payload into a device which can be delivered to a point as close as possible to the desired landing site or impact point, whereupon the device's drive system is actuated to take the payload directly to the target or target point. Once the payload has reached the target point, it is activated. This can be accomplished either automatically or by remote control. The target point is described by target coordinates, for example, which have been programmed into the device in advance. The device itself can be steered or not during the flight phase. An unsteered design is preferred. The drive system installed on the body of the device or formed by the body of the device is variable in design and should occupy a minimum of space.

To prevent the impact with the ground from damaging the body, i.e., the device, or the payload and to prevent the device from penetrating into the ground, it is provided in accordance with another embodiment of the invention that a brake system, preferably an airbag, is mounted in or on the body or projectile and that it be activated at a height of approximately 5 m, for example, above the ground. After the device has been braked and preferably while it is lying on the ground, the device then automatically determines its own position and its local orientation.

Payloads can also be defined, for example, as devices for detecting and/or destroying/neutralizing mines, and it is possible that such devices may need to stay a relatively long period of time at or on the location of the mine (the target point). The device can be a projectile, a shell, etc., and thus has the body of a projectile or missile.

The device can be delivered by, for example, a launch system such as that known from DE 101 47 837 A1, in which the trajectory of the device is as steep as possible, so that payloads can be delivered to targets located behind obstacles. If the distance is short, it is also provided according to the invention that the payload can be delivered manually.

The advantages of the solution include the fact that a payload with a preferably ballistic body (e.g., a projectile) can be delivered to a target point in such a way that the body arrives with pinpoint accuracy, undamaged, and with a preselected orientation. Distances of 20-500 m do not present a problem. There is no longer any need for a trajectory-correcting steering system, and it can therefore be omitted. The simple drive mechanism or the simple drive system positions the ballistic body precisely at the target point, so that the active systems and sensors can go into action there, that is, so that the payload can perform its function. The payload of the body can also include sensors and active systems which must remain stationary and stay in position for a relatively long time in order to perform their function properly.

The drive mechanism integrated into or mounted on the body of the device exhibits superior behavior in the presence of obstacles, especially undergrowth. In particular, the screw principle for forward movement makes it possible for the device to penetrate even through thick vegetation. Another advantage is that the active mechanisms can be triggered after a time delay and/or under remote control. The position of the projectile with respect to the target can be monitored by means of a flying platform. Deviations from the correct position can be transmitted to the device, which will then correct its position.

The invention is described in greater detail below on the basis of two selected exemplary embodiments, illustrated in the drawings.

BRIEF DESCRIPTION OF THE DRAWINGS

FIG. 1 shows a schematic diagram of the delivery of a payload to a target by means of a ballistic projectile;

FIG. 2 shows the projectile of FIG. 1 with components of a first embodiment;

FIG. 3 shows a diagram of the activated brake system of FIG. 1;

FIG. 4 shows details of the drive system of the first embodiment;

FIG. 5 shows the projectile of FIG. 1 in another embodiment with a different drive system;

FIGS. 6a-6g show the sequence of operations performed by the drive system of FIG. 5 to move the payload to the target.

DETAILED DESCRIPTION OF THE INVENTION

Figure 7:
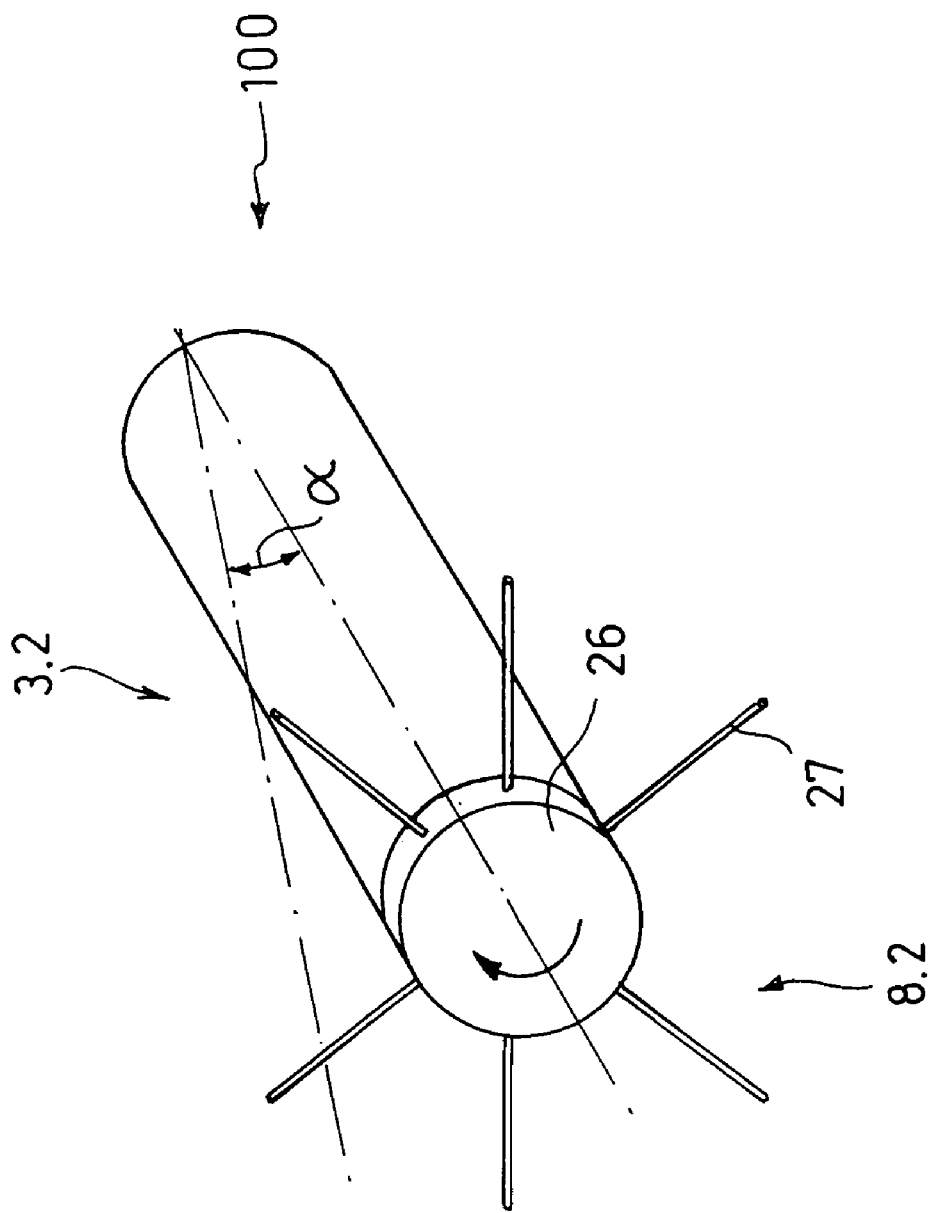
FIG. 7 shows a diagram of how the projectile of FIG. 5 can change direction while moving along the ground.

FIG. 1 is a schematic diagram showing the delivery of a device 100, preferably a ballistic missile 3 (housing), here a projectile, by means of a launching device 1 (launcher). A programming unit is designated 2, and a device especially for determining the position of the stopping point or impact point 4 (landing site) of the projectile 3 on the ground is designated 5.

The device 100, i.e., the projectile 3 (FIG. 2), has a brake system 7 (true for all embodiments), here an airbag, preferably in the front area, i.e., at the head. In addition or as an alternative, a brake system such as a parachute-like airbag can be installed at the rear (not shown). The projectile 3 also contains a drive system 8, a computer 9 for controlling sequences of operations and navigation, a programming module 10, a navigation system 11, a device 12 for determining the direction of travel, and a device 13 for determining the distance traveled. The navigation system 11 is preferably supported by a GPS receiver 15. The previously mentioned devices 9-12 and 15 are connected functionally together. The payload 14 to be delivered is located in the front area of the projectile 3.

If the coordinates of the target point 6 are known only as geodetic coordinates, it is also necessary to know the geodetic coordinates of the launcher 1 and a reference value in the form of a solid angle for the launching direction of the launcher 1 so that the azimuth, the elevation, and the starting velocity of the projectile 3 can be calculated.

If the target point 6 is visible from the launcher 1, the direction and distance to the target point 6 can be determined by the device 5, e.g., an optical direction finder and distance meter. More information on these determinations can be found in DE 101 47 837 A1, to which reference is herewith made. Once this vector is obtained, the azimuth and elevation of the launcher 1 and the starting velocity of the projectile 3 can be calculated.

Before the projectile 3 is launched, the target coordinates and the trajectory data are programmed into it. Responsible for this function are the programming device 2 on the launcher 1 and the programming module 10 in the projectile 3. After that, the launcher 1 delivers the projectile 3 ballistically as close as possible to the target 6. At a certain point along the trajectory of the projectile 3, preferably about 5 m before it hits the ground, the airbag 7 in the head of the projectile 3 is automatically activated to prevent the projectile 3 from burying itself in the ground. Because the airbag 7 can cause aerodynamic disturbances, the short distance to the ground has the effect of minimizing the deviations of the projectile 3 from the nominal trajectory.

After it has arrived at the impact point 4, the projectile 3 will be a certain distance away from the target 6. The exact distance is determined by non-ballistic factors. The process of coming to a stop after hitting the ground leads to additional deviations from the programmed position. The orientation of the projectile axis with respect to the target 6 is also random. Once the projectile 3 has come to a stop, the airbag 7 is separated. Small explosive charges on the airbag 7 (not shown) can take care of this task.

The landing site 4 of the projectile 3 is determined by the navigation device 11, preferably realized by the GPS receiver 15 alone, which is integrated into the projectile 3. The projectile 3 now starts its drive system 8, which guides it to the target 6. The projectile 3 thus moves first in a direction which is predetermined by its random landing orientation. The GPS-supported navigation device 11 determines individual position values along the route. The direction of movement of the projectile 3 in the earth coordinate system is then determined from these positions. The direction value is used next to calculate the direction of movement B (FIG. 4) required to take the projectile 3 to the target 6. On the basis of the GPS position data, the projectile 3 drives until it reaches the target 6. The computer 9 in the projectile 3 evaluates the GPS data and controls the drive system 8.

In addition to the GPS receiver 15, the device 12, preferably designed as a magnetic sensor for determining direction in the earth coordinate system, is provided in the projectile to determine the orientation of the projectile with respect to magnetic north and thus in an earth coordinate system. The projectile 3 can thus be directed immediately toward the target point. The proper direction does not have to be calculated on the basis of locations reached in the course of initial travel in a random direction.

As an alternative to the previously described method for navigating the projectile 3 to the target 6, the position of the landing site 4 of the projectile can be established by the device 5, which is located at known coordinates in the terrain. In another embodiment, the measurement can be made shortly before the projectile 3 lands on the ground by an optical direction finder and distance meter located preferably in the same place as the launcher. It is an effective measure here to provide the airbag 7 with optical reflectors 16 and to take advantage of the activation of the airbag (FIG. 3) to facilitate the measurement procedure. The landing site 4 itself is then calculated by extrapolation of the trajectory. This calculated position is transmitted to the projectile 3. The data can be transmitted by radio; or, if the position of the projectile 3 is determined by active optical means, e.g., by lasers, the data can be transmitted via the optronic measurement circuit itself. The navigation system 11 then preferably contains only one direction sensor and a sensor for measuring the distance traveled. There is no need for a GPS 15 in this case.

Two different concepts for the design of the drive system 8 are described below.

In a first embodiment of the drive system or drive mechanism 8.1, the projectile is driven in the direction of its axis. Controlled changes in direction B are possible.

For this purpose the projectile 3.1 is preferably divided into three cylindrical, coaxial, and interconnected segments 17, 18, 19 (FIG. 4). Drive motors 20, one for the front segment 18 and another for the rear segment 19 (based on the direction of movement), are installed preferably in the middle segment 17. The drive units rotate in directions such that the front and rear segments 18, 19 turn in the same direction. Helical flights 21 are mounted on the front and rear segments 18, 19. The helices on the front 18 and rear segments 19 are oriented in the same direction. The two flights 21 also have the same pitch. A flight 30 with the opposite orientation but the same pitch as that of the other flights is mounted on the middle segment 17, this flight being approximately twice as long as that on the front 18 or rear segment 19. It is assumed here that the weight of the middle segment 17 is approximately equal to the sum of the weights of the front and rear segments 18, 19.

When the motors 20 now turn the front segment 18 and the rear segment 19 in the same direction, the countertorque causes the middle segment 17 to rotate in the opposite direction. As a result of friction with the ground, the helical flights 21, 30 on segments 17-19 cause the projectile 3 to move in the direction of its longitudinal axis, provided that the friction of the front segment 18 with the ground is equal to that of the rear segment 19 and that the sum of the friction of the two segments is equal to that of the middle segment 17. The projectile 3.1 can be driven backwards or forwards, depending on the direction in which the segments are rotated.

So that the direction of the longitudinal axis of the projectile 3.1 can be changed, it is necessary only to change the drive torque of the front or rear drive motor 20. This leads to a torque differential, which causes the orientation of the projectile axis with respect to the ground to change. Through suitable actuation of the motors 20 (by having them rotate in opposite directions), it is even possible to have the projectile 3.1 turn in a circle around its center point.

Thus it is possible to control the movement of the projectile 3.1 on the ground. In addition, it is also possible in this way to compensate for differences in the friction between the ground and the contact surface of the projectile, which differences can lead to course deviations.

In another embodiment (FIG. 5), the projectile 3.2 consists of two cylindrical, concentric assemblies, one inside the other, that is, an outer assembly 22 and an inner assembly 23. The two assemblies 22, 23 can be pushed into and pulled out of each other in telescopic fashion. This function can be realized, for example, by at least one motor with a gear wheel 24 in combination with at least one toothed rack 25. The two tubular assemblies 22, 23 are each provided at the outer end with a headpiece 26, from and into which motor-driven, radial pins 27 can be extended and retracted. Preferably six pins, 60° apart, are provided in each headpiece 26. The headpieces 26 can be rotated by motors 28 in a controlled manner with respect to the assemblies 22, 23. The components just mentioned define the drive system 8.2 for this projectile 3.2.

The process by which this embodiment moves is considered in greater detail below on the basis of FIGS. 6a-6g.

In FIG. 6a, the two assemblies 22, 23 are telescoped together. The desired movement proceeds with the projectile axis pointing forward (B). The rear headpiece 26 closes off the outer assembly 22. First, the pins 27 are extended from the headpiece 26 of the inner assembly 23 (FIG. 6b). The pins 27 are widened at their ends so that they grip the ground as effectively as possible. Then the inner assembly 23 is pushed out by the motor 24. Because of the grip which the pins 27 have with the ground, the inner assembly 23 remains in position, and the outer assembly 22 is pushed forward (FIG. 6c). After the inner assembly 23 has been pushed out, the pins 27 of the rear headpiece 26 are retracted (FIG. 6d), and the pins 27 are extended from the front headpiece (26) (FIG. 6e). Then the two assemblies 22, 23 are telescoped into each other again (FIG. 6f). As a result of the grip which the pins 27 of the headpiece 26 of the outer assembly 22 have with the ground, the inner assembly 22 is pulled into the stationary outer assembly 23. Thus the projectile 3 is pushed forward in the direction of its axis by a distance approximately equal to the length of one of the assemblies 22/23. After the pins 27 have been retracted, the original configuration is available again for the next cycle (FIG. 6g).

To change direction, the headpiece 26 of one of the assemblies 22, 23 is rotated after the pins 27 have been extended. The headpiece 26 is rotated by its assigned head motor 28 until the direction has been changed by the desired angle α (FIG. 7). If the motors 28 which rotate the headpieces 26 of the two assemblies 22, 23 are operated simultaneously, the projectile 3.1 can be made to assume any desired orientation around its center axis by actuating the motors 28 in opposite directions.

The drive systems 8.1 and 8.2 described here are merely examples. It is obvious that they are not to be considered limiting and that, on the contrary, other drive systems which can move a launched body, a projectile, etc., from one position to another, possibly even in creeping fashion, are also included within the scope of the invention.

Thus, while there have been shown and described and pointed out fundamental novel features of the present invention as applied to a preferred embodiment thereof, it will be understood that various omissions and substitutions and changes in the form and details of the devices illustrated, and in their operation, may be made by those skilled in the art without departing from the spirit of the present invention. For example, it is expressly intended that all combinations of those elements which perform the same function in substantially the same way to achieve the same result are within the scope of the invention. Substitutions of elements from one described embodiment to another are also fully intended and contemplated. It is also to be understood that the drawings are not necessarily drawn to scale but that they are merely conceptual in nature. It is the intention, therefore, to be limited only as indicated by the scope of the claims appended hereto.

The invention claimed is:

1. A device, comprising: a body adapted for independent travel through air with aid of a separate launch device to a landing site a distance from a target, the body being divided into cylindrical, coaxial segments, which are connected to each other; a payload arranged in the body and operative to trigger open or concealed mines and explosive charges on or in land; a computer arranged in the body for controlling sequences of operations and navigation; a programming module and a navigation system arranged in the body and electrically connected to the computer; and an integrated land drive system installed on or formed by the body, and configured to take the body holding the payload to the target by mechanically self crawling on the surface of the ground immediately after the body has landed at the landing site, the drive system including a first drive motor for a front segment and a second drive motor for a rear segment, the drive motors being provided in a middle segment, wherein helical flights are mounted on the front and rear segments, the flights on the front segment and the rear segment having a common orientation and a common pitch, wherein a flight is mounted on the middle segment and has an opposite orientation but a common pitch as the flights on the front and rear segments, the flight of the middle segment being substantially twice a length of one of the other flights.

2. The device according to claim 1, and further comprising a device for determining direction and a device for determining distance traveled, both devices being integrated into the body.

3. The device according to claim 1, and further comprising a brake system provided on the body so as to activate about 5 m above the landing site.

4. The device according to claim 3, wherein the brake system is an airbag that detaches when the body comes to rest.

5. The device according to claim 4, wherein small explosive charges are arranged on the airbag for detaching the airbag from the body.

6. The device according to claim 1, and further comprising a device for determining direction and a device for determining distance traveled.

7. The device according to claim 6, wherein the device for determining direction operates in the earth coordinate system and is constructed as a magnetic sensor.

* * * * *